United States Patent
Breslau et al.

(10) Patent No.: US 10,691,420 B1
(45) Date of Patent: Jun. 23, 2020

(54) DYNAMIC FUNCTION ARGUMENT COMPLETION

(71) Applicant: The MathWorks, Inc., Natick, MA (US)

(72) Inventors: Jason D. Breslau, Holliston, MA (US); Kenneth E. Atwell, Harvard, MA (US)

(73) Assignee: The MathWorks, Inc., Natick, MA (US)

( * ) Notice: Subject to any disclaimer, the term of this patent is extended or adjusted under 35 U.S.C. 154(b) by 221 days.

(21) Appl. No.: 15/131,503

(22) Filed: Apr. 18, 2016

(51) Int. Cl.
*G06F 9/44* (2018.01)
*G06F 8/33* (2018.01)
*G06F 8/34* (2018.01)

(52) U.S. Cl.
CPC . *G06F 8/33* (2013.01); *G06F 8/34* (2013.01)

(58) Field of Classification Search
CPC .................................... G06F 8/33; G06F 8/34
See application file for complete search history.

(56) References Cited

U.S. PATENT DOCUMENTS

| | | | | |
|---|---|---|---|---|
| 6,314,559 B1* | 11/2001 | Sollich | ...................... | G06F 8/33 717/111 |
| 6,507,842 B1* | 1/2003 | Grey | ................... | G06F 11/3672 |
| 8,051,408 B1* | 11/2011 | Johnson | ..................... | G06F 8/33 715/705 |
| 2002/0016953 A1* | 2/2002 | Sollich | ...................... | G06F 8/33 717/100 |
| 2004/0078674 A1* | 4/2004 | Raimi | ................... | G06F 17/504 714/33 |
| 2005/0015747 A1* | 1/2005 | Zatloukal | .................. | G06F 8/33 717/109 |
| 2005/0177773 A1* | 8/2005 | Hadley | ............... | G06F 11/3672 714/38.1 |
| 2006/0026559 A1* | 2/2006 | Gunturi | ..................... | G06F 8/20 717/110 |
| 2007/0006142 A1* | 1/2007 | Shulman | ................... | G06F 8/33 717/111 |
| 2008/0066062 A1* | 3/2008 | Zatloukal | .................. | G06F 8/33 717/143 |
| 2008/0263524 A1* | 10/2008 | Adams | ...................... | G06F 8/00 717/127 |
| 2008/0320438 A1* | 12/2008 | Funto | ........................ | G06F 8/33 717/106 |
| 2013/0263086 A1* | 10/2013 | Carter | ...................... | G06F 8/33 717/113 |
| 2013/0268912 A1* | 10/2013 | Kizhakkevalappil | ..... | G06F 8/34 717/109 |
| 2015/0067640 A1* | 3/2015 | Booker | ..................... | G06F 8/33 717/109 |
| 2016/0188448 A1* | 6/2016 | Sankaranarasimhan | ..................... | G06F 11/3688 717/128 |

* cited by examiner

*Primary Examiner* — Lewis A Bullock, Jr.
*Assistant Examiner* — Tina Huynh
(74) *Attorney, Agent, or Firm* — Wolf, Greenfield & Sacks, P.C.

(57) ABSTRACT

A device may receive code and may identify a function included in the code. The device may identify for display and user selection a first argument value, corresponding to a first argument of the function, included in the code. The device may determine one or more valid values for a second argument associated with the function based on the function and the first argument value. The device may provide the one or more valid values for the second argument for display.

20 Claims, 16 Drawing Sheets

```
┌─────────────────────────────────────────────────────────┐
│ TECHNICAL COMPUTING ENVIRONMENT (TCE) 102        [_][□][X]│
├─────────────────────────────────────────────────────────┤
│ File  Edit  Tools  View  Execute                        │
├─────────────────────────────────────────────────────────┤
│ Code Editor 104                                         │
│                                                         │
│  ...                                                    │
│  recordAudio(Headset)                                   │
│  ...                                        ┌─────────────────────┐
│ 122⟶readtable('Budget.xlsx', 'Sheet', 'Month',│ Valid Argument      │←118
│                              ↑              │ Values              │
│                              156            │  Basic              │
│                                             │  FileType           │
│                                             │  ReadVariableNames  │
│                                             │  ReadRowNames       │
│                                             │ ┌─────────────────┐ │←160
│                                             │ │ Range           │ │
│                                             │ └─────────────────┘ │
│                                             │  TreatAsEmpty       │
│                                             └─────────────────────┘
│                                                    158
│                                             Provide valid argument
│                                                values for display
│                                                     ↑
│                              Use value of third argument to determine
│                                 valid values for fourth argument
└─────────────────────────────────────────────────────────┘
```

FIG. 1E

```
TECHNICAL COMPUTING ENVIRONMENT (TCE) 102
File  Edit  Tools  View  Execute

Code Editor 104

...
recordAudio(Headset)
...
readtable('Budget.xslx', 'Sheet', 'Month', 'Range')
...
170 → ShapeSizeColor(blue, large, cone)
```

FIG. 1L

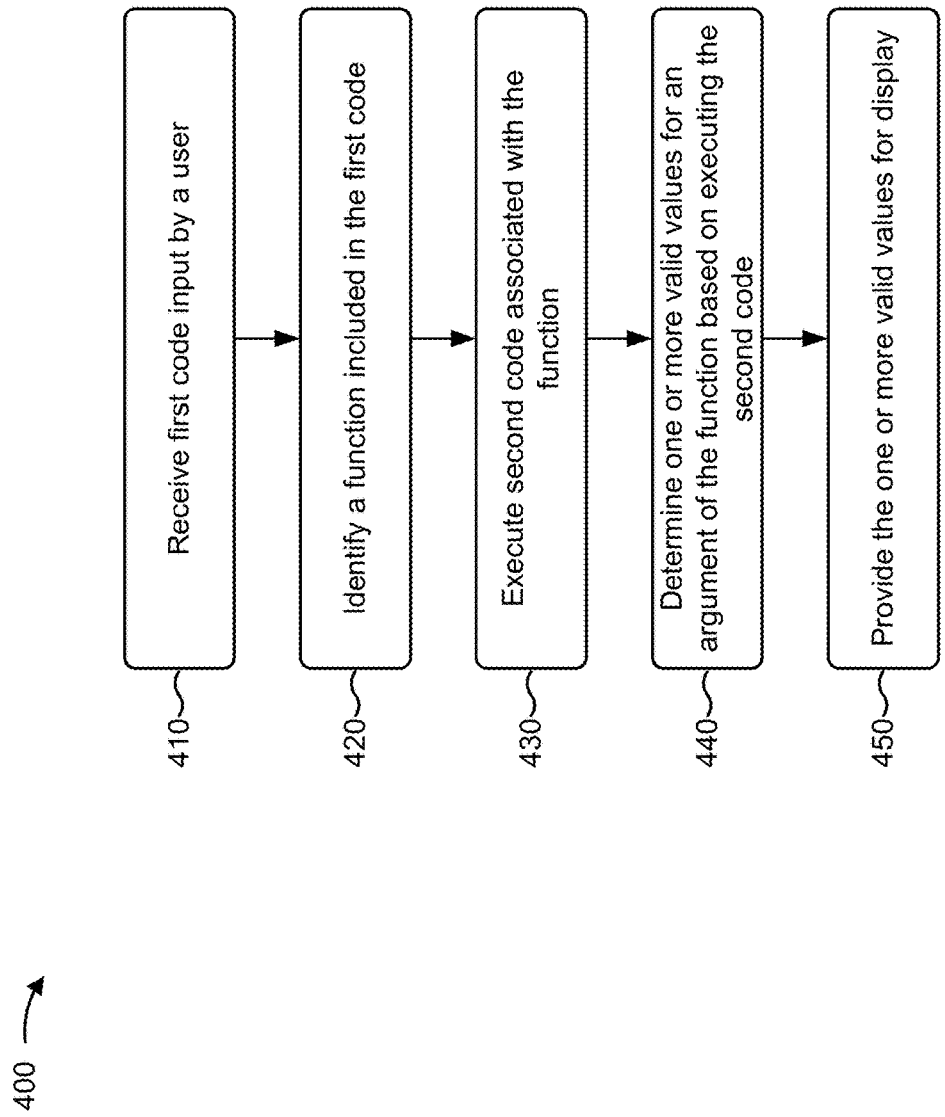

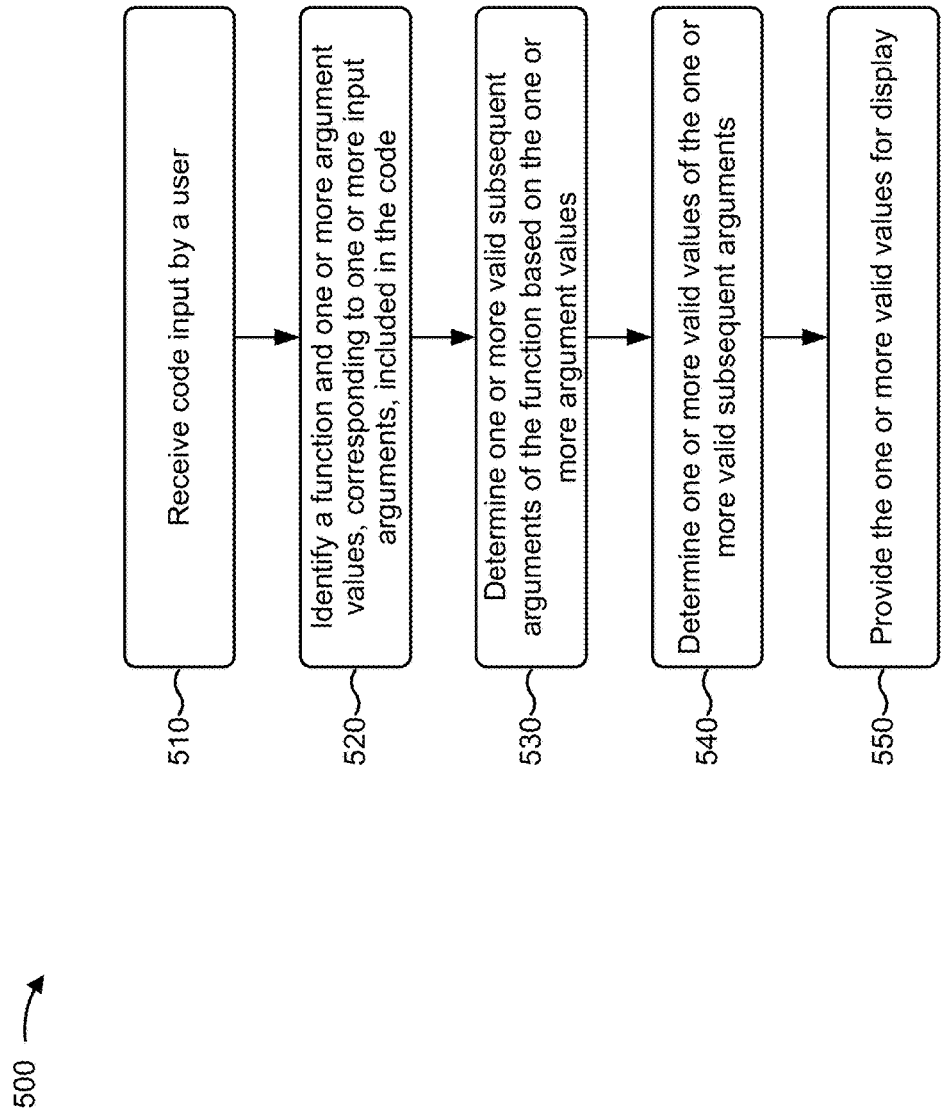

DYNAMIC FUNCTION ARGUMENT COMPLETION

BRIEF DESCRIPTION OF THE DRAWINGS

FIGS. 1A-1L are diagrams of an overview of an example implementation described herein;

FIG. 4 is a flow chart of an example process for dynamic function argument completion; and FIG. 5 is a flow chart of another example process for dynamic function argument completion.

DETAILED DESCRIPTION

Figure 1A:
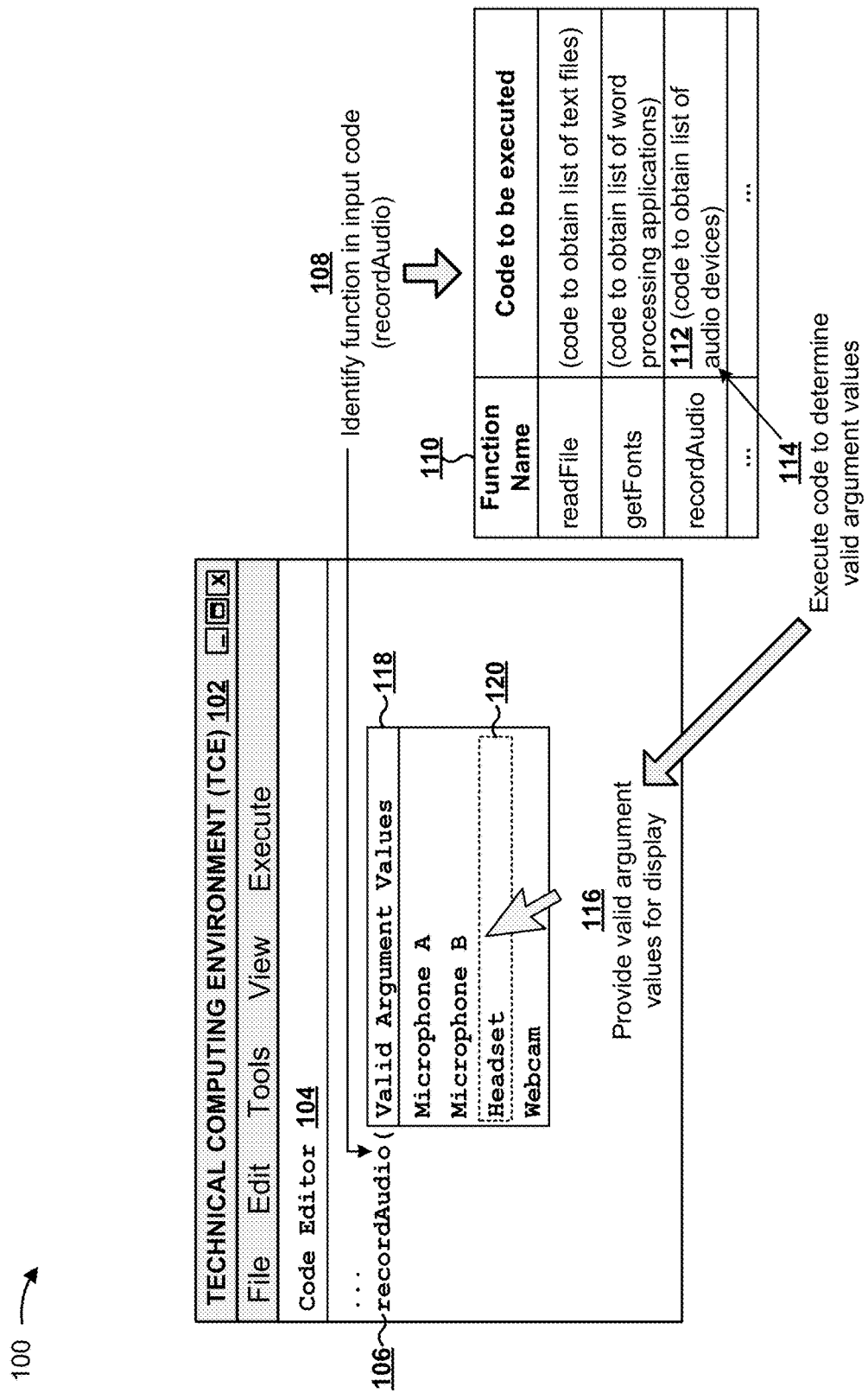

The following detailed description of example implementations refers to the accompanying drawings. The same reference numbers in different drawings may identify the same or similar elements.

In computer programming, a function may refer to a sequence of program instructions that performs a specific task. A function may include one or more input arguments on which the function is performed, and may generate an output (e.g., a return value) based on performing the function on the input argument(s). A function signature may define a name of the function, arguments of the function (e.g., a quantity of arguments, names of the arguments, data types of the arguments, etc.), outputs from the function (e.g., a quantity of outputs, names of the outputs, data types of the outputs, etc.), parameters of the function and/or individual arguments (e.g., an order of the arguments, default values for the arguments, etc.), constraints of the function (e.g., requirements associated with the arguments), or other features related to the function. Class methods, static class methods, and packaged functions may exhibit similar characteristics. Examples of tasks performed by functions may include performing mathematical operations, generating plots, or the like.

A user (e.g., a computer programmer) may use a function in program code by writing code that is compliant with a function signature (e.g., by inputting a function call into the program code). For example, a part of the program code may call the function to perform the task of the function. Typically, the call identifies the function (e.g., through the function name, arguments, etc.). However, using function signatures for program code can be difficult, time consuming, and error prone. For example, a user may be required to have a deep understanding of, and/or remember the function signature (e.g., the quantity, order, data type, etc. of arguments, the function constraints, etc.) in order to correctly invoke the function.

For example, a function constraint may refer to a condition that must be satisfied by a value of an input argument in order for the function to be valid (e.g., for the function to operate properly and/or without generating an error). In other examples, a function constraint may require values for the input arguments to be input to the function in a particular order, may require a value to be specified for one or more input arguments, or may require that a value of an input argument be a particular data type or dimensionality. Additionally, a function constraint may require that a value of an input argument matches a valid value (e.g., is within a range of valid values or a set of discrete valid values) and/or may require a particular relationship between values of one or more input arguments. In some cases, valid values may include a fixed set of values, may vary depending on previous argument values, and/or may depend on system-specific settings. Without a deep understanding of the function and possibly a lot of memorization, a user may not understand such constraints or use the function properly.

Implementations described herein may assist a user in using a function in program code by dynamically completing a function signature without requiring a user to provide all information of the signature. In some implementations, selectable valid values for function arguments are provided to a user dynamically as the user inputs the function signature based on information the user has already input in the program code. The implementations may reduce a quantity of errors associated with using functions in program code, thereby conserving computing resources, such as processing power, memory, or the like, and reducing programming time.

FIGS. 1A-1L are diagrams of an overview of an example implementation 100 described herein. In the examples shown in FIGS. 1A-1L, the programming environment is a technical computing environment (TCE) 102 executing on a device. In some implementations, TCE 102 may receive code input by a user. For example, a user (e.g., a computer programmer) may input program code via a code editor window 104 of TCE 102. For example, as shown in FIG. 1A, assume that the user inputs code 106, shown as a function named "recordAudio."

In some implementations, TCE 102 may identify a function included in code 106. For example, TCE 102 may parse code 106 to identify the function. In some implementations, TCE 102 may identify a function included in code 106 based on a function name. For example, TCE 102 may store (e.g., in a data structure) or access information identifying a function name. For example, as shown by reference number 108, TCE 102 may identify the function "recordAudlo" in code 106 (e.g., based on parsing code 106). Additionally, as shown in FIG. 1A, TCE 102 may access information in data structure 110 identifying function names (e.g., "readfile," "getFonts," "recordAudio," or the like) based on identifying the function in code 106. The data structure 110 may be stored local to or remote from the device that is executing TCE 102.

In some implementations, TCE 102 may store or access information (e.g., in the data structure) that associates a function name with code to be executed to generate a list of valid arguments and/or valid argument values for the function. In some implementations, the code may be stored as part of the function source code or as auxiliary metadata provided with the function source code, and may be MATLAB code, C code, C++ code, or the like. Auxiliary metadata may be JavaScript Object Notation (JSON), extensible markup language (XML), or any similarly-structured text or binary data representation. In some implementations, the code may be provided by a developer of TCE 102. Additionally, or alternatively, the code may be provided by a user (e.g., a computer programmer, a function author, or the like). In some implementations, the code may be associated with one or more functions (e.g., the code may be associated with multiple functions that share a same function signature, a subset of a function signature, or the like).

In some implementations, the code may include code in a code editor that includes the function. For example, a user may input the code via a code editor, and may also input the function via the code editor. TCE 102 may execute the input code or a portion of the input code to determine one or more valid values for arguments of the function. In some implementations, TCE 102 may execute code as the code is input (e.g., may execute the code in real time without waiting for completion of the program), and may use results of such execution to determine the valid values for the function arguments. In some implementations, execution results or states may be stored along with continuous execution. In this way, the results or states can later be used for further execution and/or to determine valid values for the function arguments.

In some implementations, when the code is executed, a state machine or state diagram is generated based on the requirements of the function (e.g., the arguments, sequence of the arguments, etc.), and/or based on the data (e.g., in the form of a file, on which the function is to act to perform the desired task). The state machine (e.g., a finite-state machine or a finite-state automaton) may include a data structure that is capable of being associated with one or more states. The state machine and a list of valid values may be generated in real time (e.g., as the function name is being input into TCE 102). A list of valid values may be generated for each argument of the function corresponding to the correct sequence of arguments. In some implementations, a state machine for a function and, optionally, a set of data is stored after an initial generation when the function is first applied to the data or is pre-generated before use of the function on the data. In later use, the state machine can be accessed during the use of the function for generating valid values for function arguments. In some implementations, if a function's implementation (e.g., signature) is modified by the user, then the state machine and data may be automatically updated.

In addition to the features of the function, and optionally the data on which the function acts, other features may be used in determining the valid values. In some implementations, TCE 102 may query an operating system of a device that is executing TCE 102 to determine the valid values (e.g., a list of devices connected to the device, a list of files stored by the device, a list of files stored in a location associated with the device, or the like). Additionally, or alternatively, TCE 102 may query an application (e.g., a word processing application, a spreadsheet application, an email application, or a media player application) to determine valid values (e.g., a list of fonts in a document, a list of sheets in a spreadsheet, attributes of an email application, a list of song titles from a media player application, or the like). Additionally, or alternatively, TCE 102 may query a web service, a database, or another information repository (e.g., local to or remote from the device that is executing TCE 102) to determine valid values. Additionally, or alternatively, TCE 102 may obtain values from a file to determine valid values.

In some implementations, the valid values may be dynamic (e.g., may change over time). For example, valid values may vary as peripherals (such as audio devices) are added (e.g., connected) and removed from the device, may vary as files (e.g., files accessible by the device that is executing TCE 102) are modified, or the like. Additionally, or alternatively, the valid values may depend on an environment in which the program code is run (e.g., may depend on an operating system, the device that is executing TCE 102, software applications, etc.).

In some implementations, the valid values may include filenames. Additionally, or alternatively, the valid values may include filenames having a particular extension (e.g., ".csv," ".docx," ".xls," ".xlsx," or the like), or filenames associated with files that are located at a particular location (e.g., associated with TCE 102 and/or located at a user provided location). In some implementations, the valid values may be values other than filenames or folder names. For example, the valid values may be particular documents, spreadsheets, or the like. Additionally, or alternatively, the valid values may be discrete values (e.g., "1," "2," "sheet1," etc.) or a further constraint on valid values ("positive integers", a 3×1 matrix, and so on) rather than a data type (e.g., "integer," "string," etc.).

For example, as shown in FIG. 1A, TCE 102 may identify code 112 associated with the function name "recordAudio." In some implementations, TCE 102 may access code 112 (e.g., based on function source code or auxiliary metadata). As shown by reference number 114, TCE 102 may execute code 112 to determine valid values, such as a list of audio devices, for an argument of the "recordAudio" function. In some implementations, different arguments for a function may be associated with different code, different valid values, or the like. In some implementations, TCE 102 may provide selectable valid values for a function argument dynamically as the user inputs the function signature. For example, assume that execution of code 112 causes TCE 102 to query an operating system of a device that is executing TCE 102 to determine that "Microphone A," "Microphone B," "Headset," and "Webcam" are audio input devices that are connected to the device. TCE 102 may provide the list of valid values (e.g., audio input devices) as the user inputs the function signature for the "recordAudio" function.

In some implementations, TCE 102 may provide one or more valid values for display. For example, TCE 102 may provide valid values for the argument for display via a graphical user interface (GUI) of TCE 102. Additionally, or alternatively, TCE 102 may provide an input mechanism that permits a user to interact with the valid values (e.g., a drop-down list, a menu, a text box, a check box, a button, a slider, or the like). For example, as shown in FIG. 1A, and by reference number 116, TCE 102 may provide valid values for display via menu 118.

In some implementations, a user may interact with the input mechanism to select a valid value. For example, a user may select a valid value by interacting with the valid value (e.g., clicking, highlighting, etc.). Additionally, or alternatively, a user may start typing a valid value, which may cause TCE 102 to filter valid values (e.g., TCE 102 may display valid values that begin with the typed character(s)). In some implementations, TCE 102 may only provide the valid values for display based on the user starting to input a value. In some implementations, TCE 102 may insert a valid value in the user's invocation of a function based on a user interaction with the valid value. For example, as shown in FIG. 1A, the user may interact with menu 118 to select valid value 120 (e.g., by clicking "Headset"). For example, the valid value may be included (e.g., inserted) in code 106 based on the user interaction, as shown in FIG. 1B.

Figure 1B:
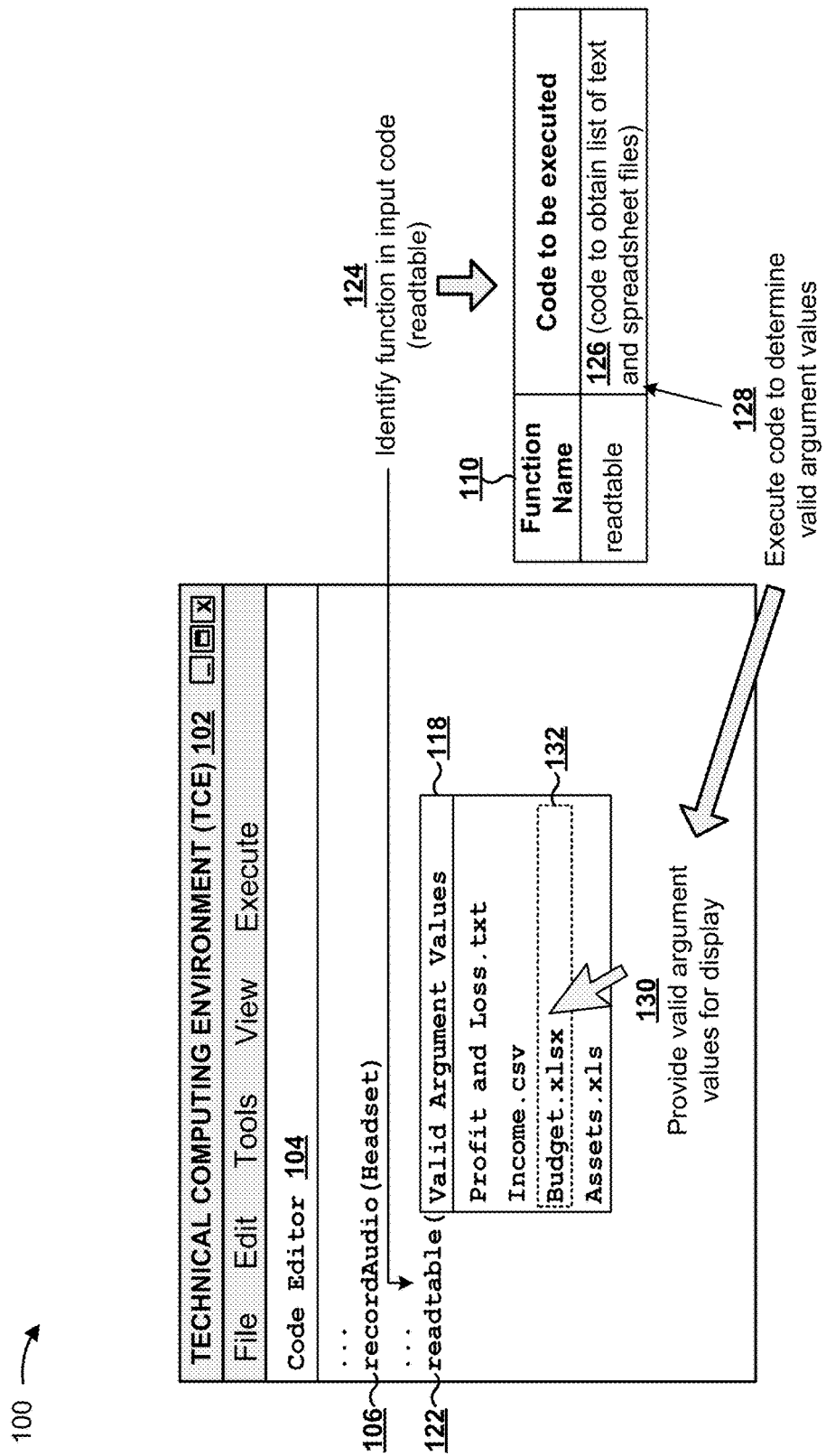

As further shown in FIG. 1B, assume that a user inputs code 122, shown as a function named "readtable," via code editor window 104 of TCE 102. As shown by reference number 124, TCE 102 may identify the function "readtable" in code 122. Additionally, or alternatively, TCE 102 may identify the function based on information identifying the function name and may identify code 126 associated with the function name (e.g., using data structure 110). As shown by reference number 128, TCE 102 may execute code 126 to determine valid values (e.g., a list of text files and spreadsheet files) for an argument of the function "readtable."

For example, TCE 102 may query an operating system associated with a device that is executing TCE 102 based on executing code 126 and may determine a list of files on which the function "readtable" can act. The files can include text files and/or spreadsheet files stored by the device, stored at a user-specified location (e.g., local to or remote from the device that is executing TCE 102), etc. For example, as shown, the valid values may include filenames associated with extensions including ".txt," ".csv," ".xlsx," and ".xls".

As shown by reference number 130, TCE 102 may provide the valid values for display via menu 118. As shown, the user may interact with menu 118 to select valid value 132, shown as "Budget.xlsx." Additionally, TCE 102 may include (e.g., insert) valid value 132 in code 122 (e.g., as the initial argument) based on the user interaction with valid value 132, as shown in FIG. 1C.

Figure 1C:
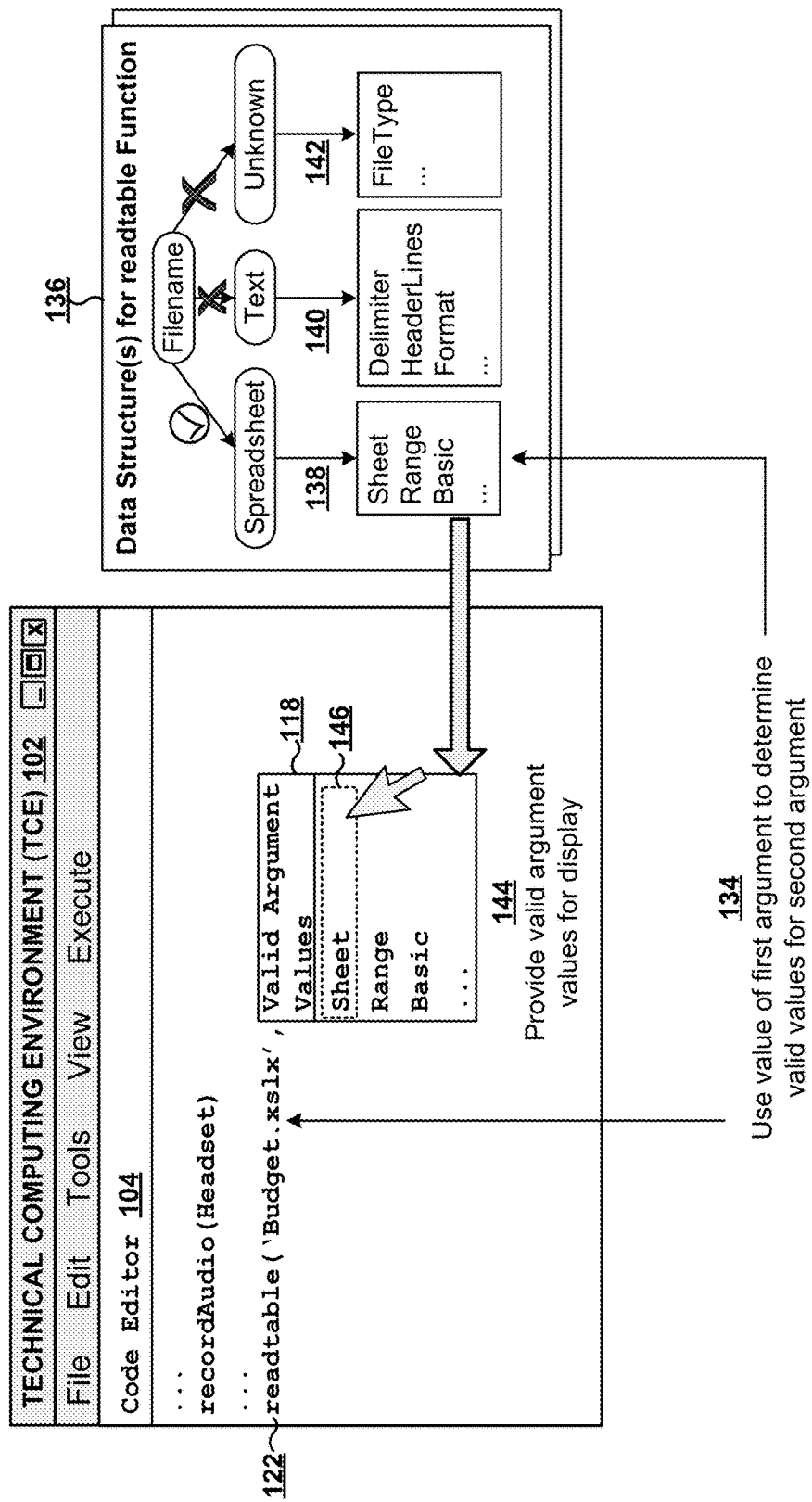

For example, as further shown in FIG. 1C, and by reference number 134, TCE 102 may use a value of a first argument (e.g., "Budget.xlsx") to determine valid subsequent arguments and/or valid values. For example, TCE 102 may use data structure(s) 136 to determine a valid second argument and/or valid values for the second argument. For example, the function "readtable" may include multiple function signatures (e.g., may accept different subsequent argument values based on an input argument). For example, as shown, data structure(s) 136 may store a state machine (e.g., shown as branches or states of "Spreadsheet," "Text," and "Unknown" in data structure 136) that may be used to determine subsequent valid arguments and/or valid values that depend on an input for the argument "Filename."

In some implementations, TCE 102 may use the state machine to determine valid values for arguments of the function. For example, a list of valid values may be generated based on accessing a file (e.g., a file having a filename inputted into the function) and/or file metadata. In some implementations, TCE 102 may generate a state machine based on function source code and/or file metadata. Additionally, TCE 102 may eliminate values as valid values based on the state machine. In some implementations, TCE 102 may dynamically generate the state machine as the user inputs the function name and/or arguments.

For example, if the first input argument value for the function "readtable" is a spreadsheet file, then TCE 102 may use the state machine (e.g., a "Spreadsheet" state) stored in data structure(s) 136 to determine subsequent valid values 138 (e.g., "Sheet," "Range," "Basic," or the like). Additionally, TCE 102 may determine that values 140 and values 142 are invalid. Alternatively, if the first input argument value is a text document file, then TCE 102 may use the state machine (e.g., a "Text" state) to determine subsequent valid values 140, and determine that values 138 and values 142 are invalid. Alternatively, if the first input argument value is another type of file, then TCE 102 may use the state machine (e.g., an "Unknown" state) to determine subsequent valid values 142, and determine that values 138 and values 140 are invalid.

As shown in FIG. 1C, and by reference number 144, TCE 102 may provide subsequent valid values 138, shown as "Sheet," "Range," and "Basic," for display because the first input argument, "Budget.xlsx," is a spreadsheet file. For example, TCE 102 may filter (e.g., narrow) valid values based on the state machine (e.g., the "Spreadsheet" state). As shown, the user may select valid value 146 ("Sheet") and TCE 102 may include valid value 146 in code 122 as the second argument, as shown in FIG. 1D.

Figure 1D:
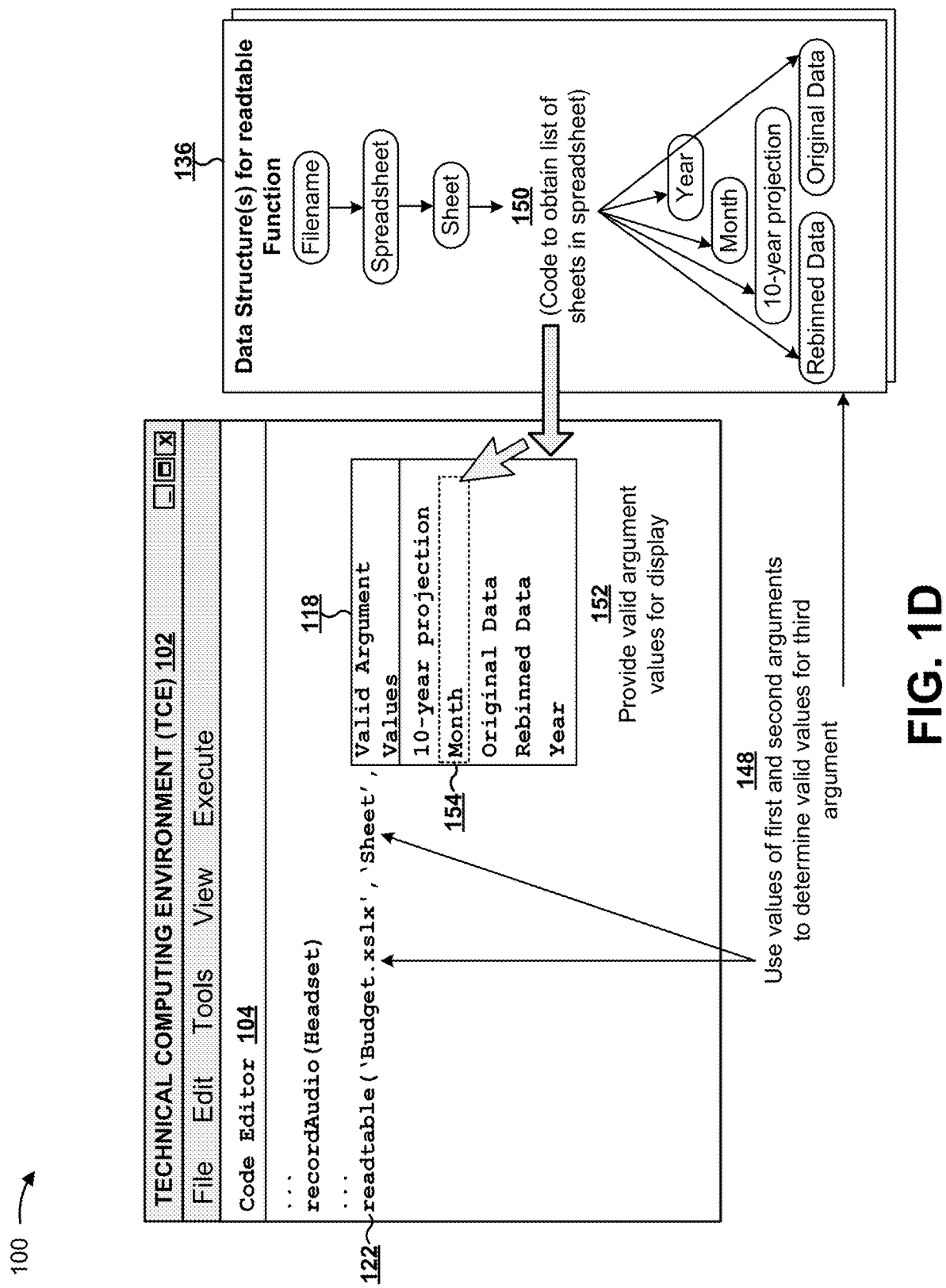

As further shown in FIG. 1D, and by reference number 148, TCE 102 may use the values of the first argument ("Budget.xlsx") and the second argument ("Sheet") to determine valid argument values for a third argument. For example, TCE 102 may identify code 150 that may be executed to determine valid values for the third argument (a list of sheets in the spreadsheet identified by the filename "Budget.xlsx"). In some implementations, TCE 102 may identify particular code for each argument (e.g., different code may be executed to determine valid values for different arguments). For example, TCE 102 may query an application (a spreadsheet application) to determine a list of sheets in the spreadsheet (e.g., to determine valid values for the arguments).

As shown by reference number 152, TCE 102 may provide the valid values for the third argument for display via menu 118. As shown, the user may select valid value 154 (a sheet entitled "Month") and TCE 102 may include (e.g., insert) valid value 154 in code 122 as the third argument, as shown in FIG. 1E.

As further shown in FIG. 1E, and by reference number 156, TCE 102 may use the value of the third argument ("Month") to determine valid values for a fourth argument. For example, TCE 102 may use the value of the third argument, and may not use the values of other arguments (e.g., the first argument and/or the second argument), to determine valid values for the fourth argument. Although not shown, TCE 102 may use data structure 110 to determine the valid values for the fourth argument. As shown by reference number 158, TCE 102 may provide the valid values for display via menu 118. As shown, the user may select valid value 160 ("Range"), and TCE 102 may include valid value 160 in code 122 as the fourth argument, as shown in FIG. 1G.

While the example shown in FIG. 1E describes determining valid values for the fourth argument based on the third argument and not the first argument or second argument, TCE 102 may use all (or some) of the previous arguments (e.g., the first, second, and third arguments) when determining valid values for a subsequent argument (e.g., the fourth argument). In some implementations, TCE 102 may provide a list of valid values based on the value of an argument. For example, assume that the fourth argument requires a fifth argument that includes a logical value (e.g., "true" or "false"). Based on the fourth argument, TCE 102 may provide valid values (e.g., "true" or "false") for the fifth argument for display.

Figure 1F:
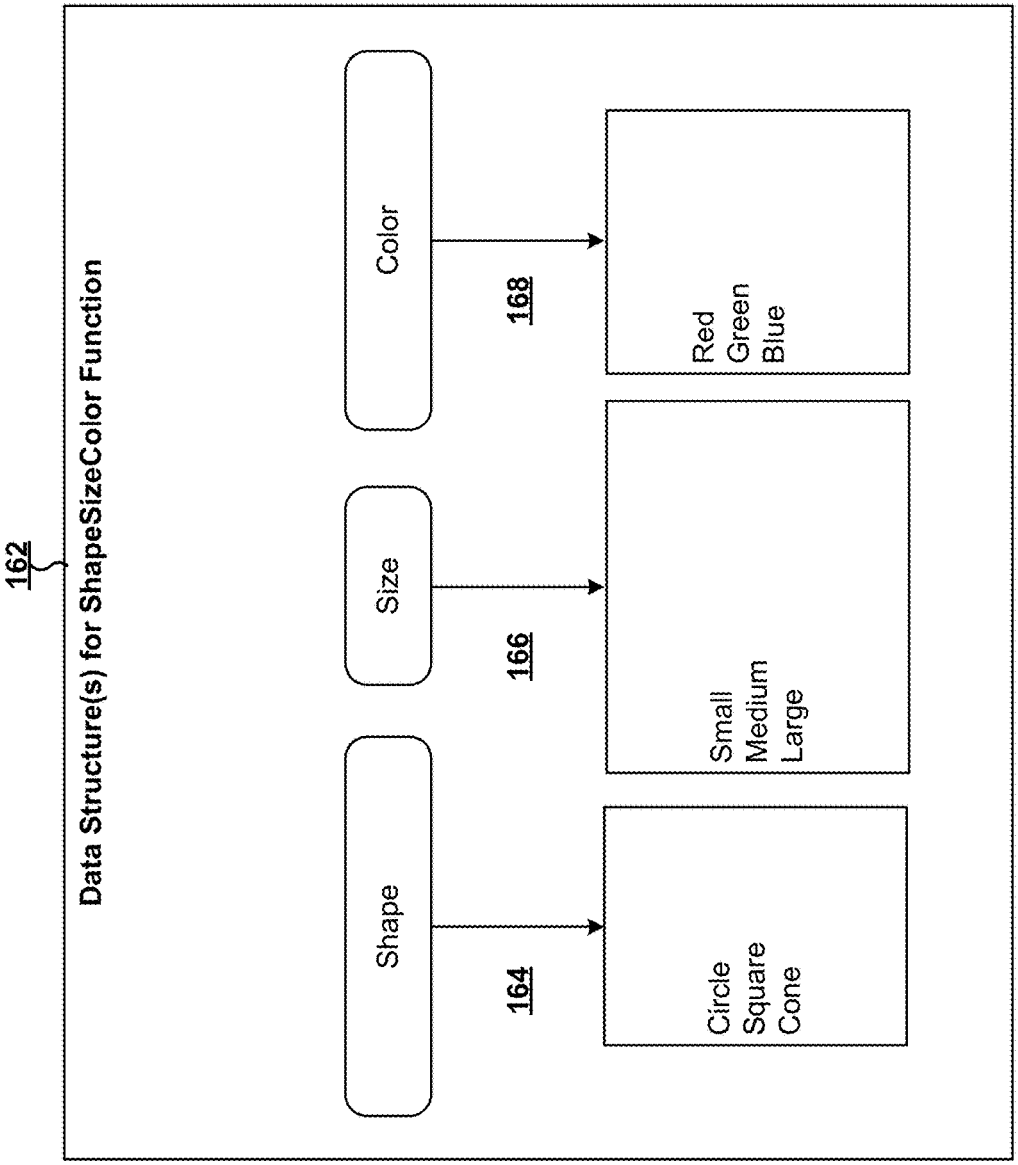

As shown in FIG. 1F, data structure(s) 162 may store a state machine (e.g., shown as branches or states of "Shape," "Size," and "Color" in data structure 162) that may be used to determine valid values for arguments of the function "ShapeSizeColor." Assume that the function "ShapeSizeColor" includes a function signature defining three input arguments (e.g., "Shape," "Size," and "Color"). Further, assume that the function signature does not define a particular input order associated with the three input arguments. As shown, data structure 162 may store values 164, values 166, and values 168.

Figure 1G:
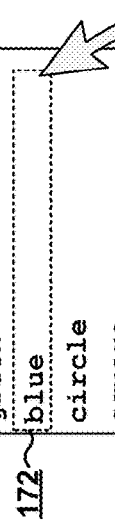

As shown in FIG. 1G, in another example, assume that a user inputs code 170, shown as the function "ShapeSizeColor," via code editor window 104 of TCE 102. For example, TCE 102 may parse code 170 and may identify the function "ShapeSizeColor." TCE 102 may use data structure 162 corresponding to the function "ShapeSizeColor" to determine valid arguments and/or valid values (e.g., for the first argument, the second argument, and the third argument). For example, TCE 102 may provide a list of valid values for the first argument for display via menu 118. For example, as shown, TCE 102 may provide a list including valid values 168 corresponding to the "Color" argument ("red," "green," and "blue"), valid values 164 for the "Shape" argument ("circle," "square," and "cone"), and valid values 166 for the "Size" argument ("small," "medium," and "large"). As shown, the user may select valid value 172 ("blue"), and TCE 102 may input valid value 172 in code 170 as the first argument, as shown in FIG. 1I. In this way, the user may be permitted to input arguments in any order, thereby making computer programming easier for the user without requiring an understanding of a particular syntax.

Figure 1H:
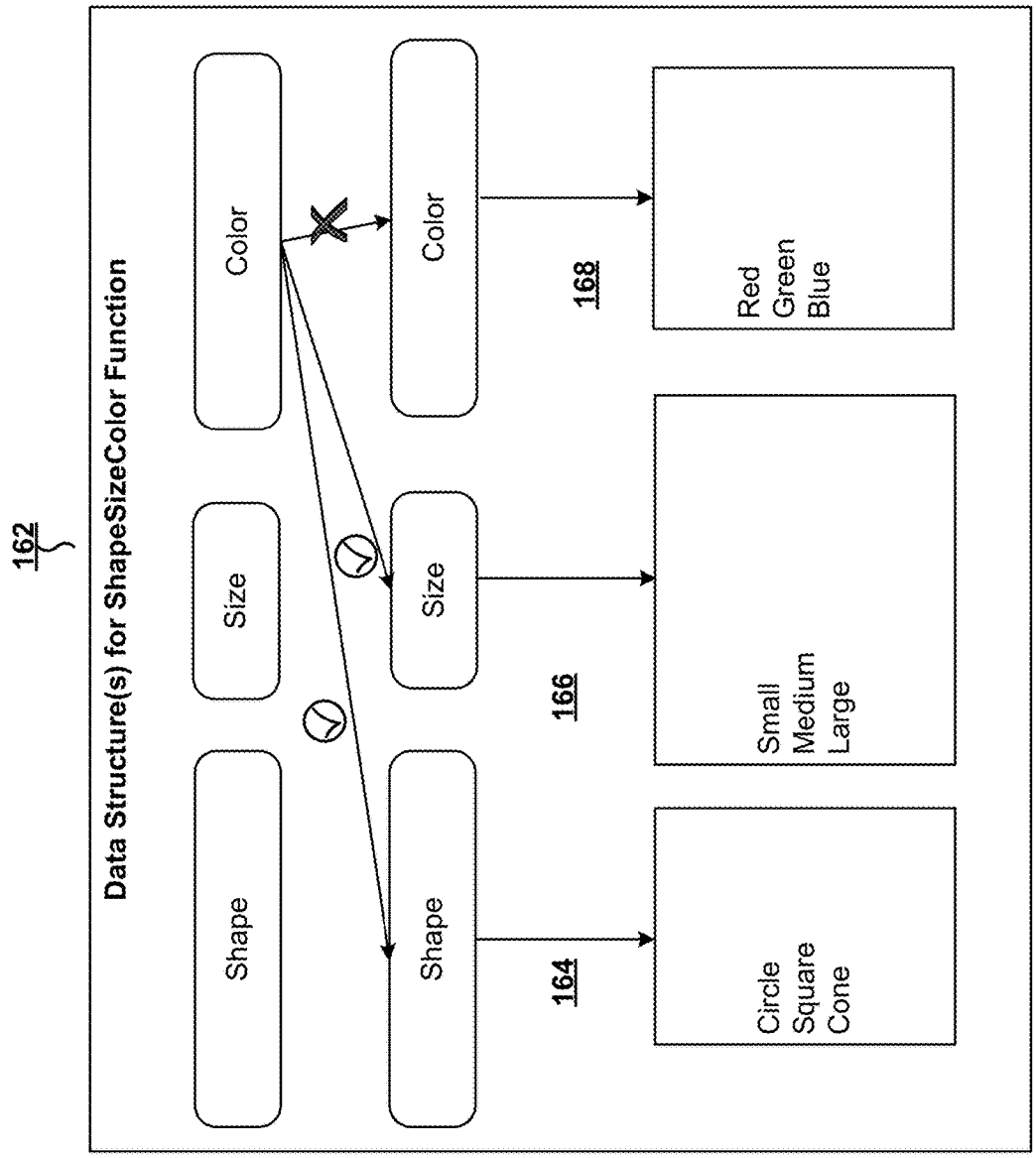
Figure 1I:
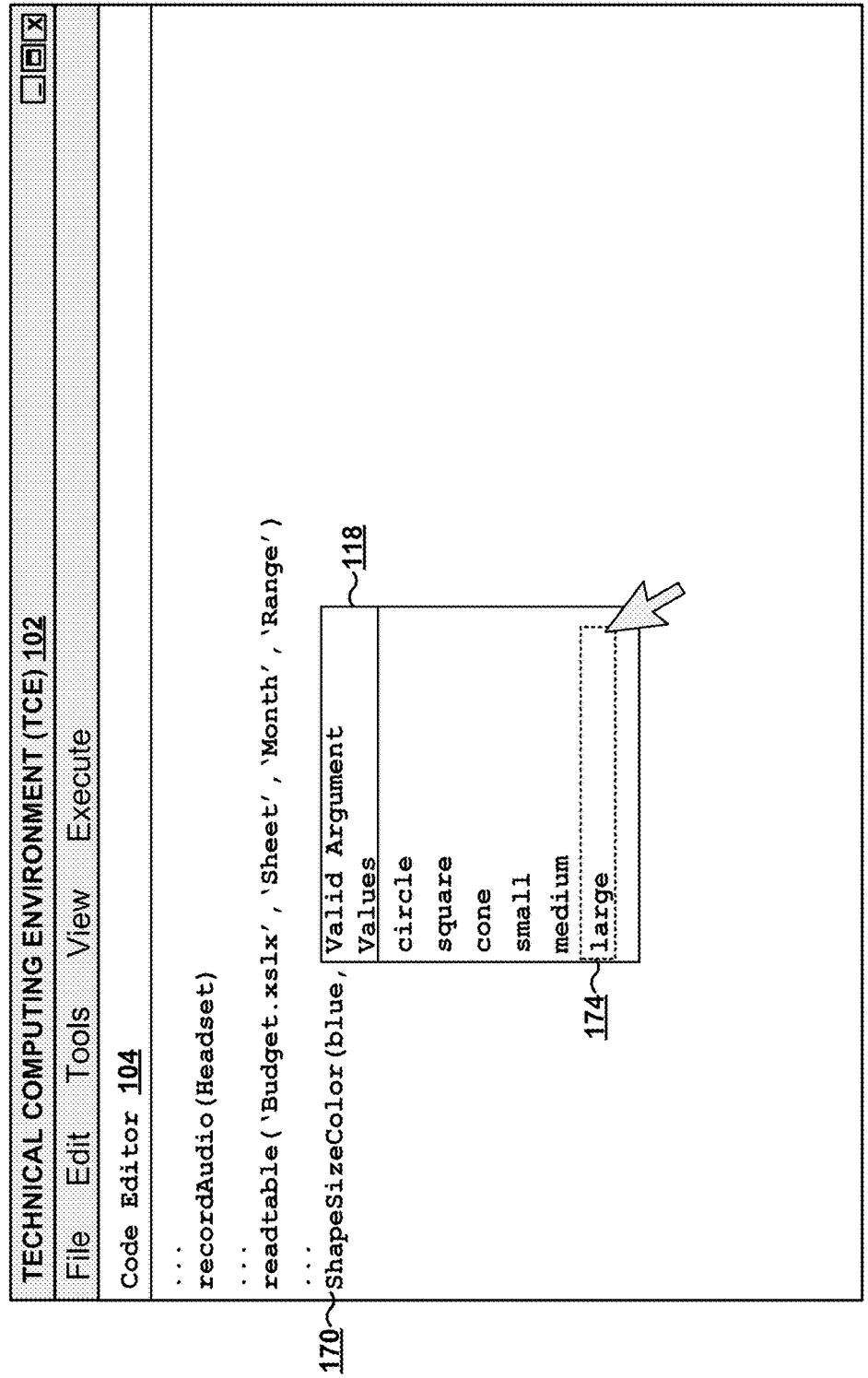

As shown in FIG. 1H, TCE 102 may store a state associated with the state machine corresponding to the "Color" argument. In this way, TCE 102 may eliminate values associated with the "Color" argument as valid values for the second argument because the user selected a "Color" argument for the first argument. For example, as shown, TCE 102 may use the state machine to determine that values 164 and values 166 are valid values for the second argument.

As further shown in FIG. 1I, TCE 102 may provide a list of valid values for the second argument for display via menu 118. For example, as shown, TCE 102 may provide, for display, argument values that are associated with the "Shape" argument and the "Size" argument as valid values for the second argument. As shown, the user may select valid value 174 ("large"), and TCE 102 may input valid value 174 in code 170 as the second argument, as shown in FIG. 1K.

Figure 1J:
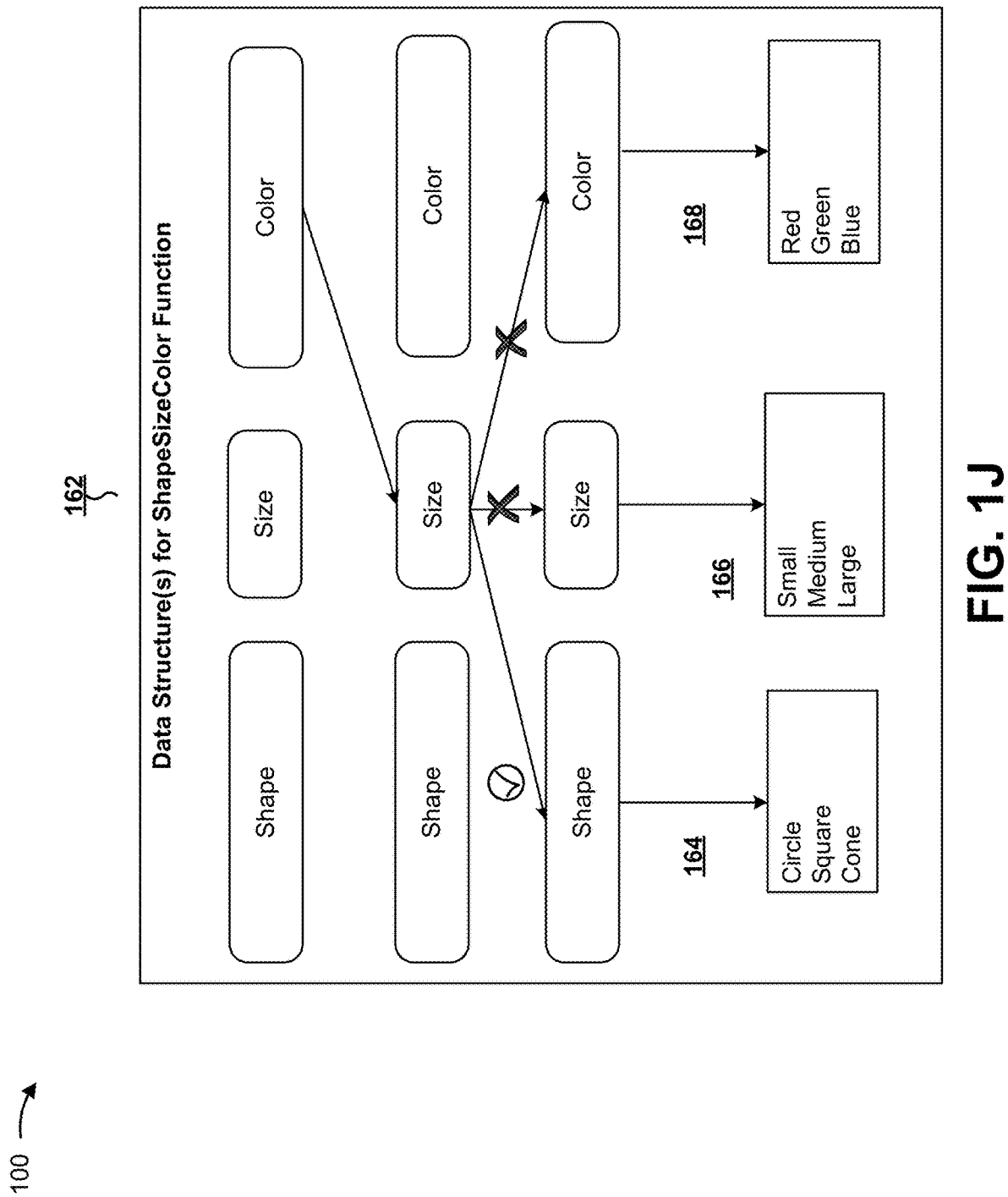

As shown in FIG. 1J, TCE 102 may store a state associated with a state machine corresponding to the "Size" argument. In this way, TCE 102 may eliminate argument values associated with the "Size" argument as valid values for the third argument because the user selected a "Size" argument for the second argument. Additionally, TCE 102 may use the state machine to eliminate argument values associated with the color argument as valid values for the second argument because the user selected a "Color" argument for the first argument. For example, as shown, TCE 102 may use the state machine to determine that values 164 are valid values for the third argument.

Figure 1K:
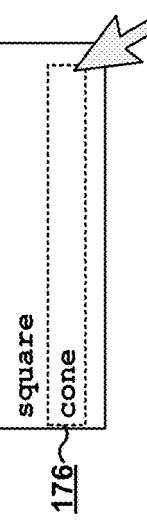

As further shown in FIG. 1K, TCE 102 may provide, for display, a list of valid values for the third argument. For example, the list of valid values may include argument values that are associated with the "Shape" argument, and may not include argument values associated with the "Size" and "Color" arguments (e.g., based on states corresponding to the "Size" and "Color" arguments). As shown, the user may select valid value 176 ("cone"), and TCE 102 may input valid value 176 in code 170 as the third argument, as shown in FIG. 1L.

As further shown in FIG. 1L, TCE 102 may display code 170 and the function "ShapeSizeColor" including valid values for the first, second, and third arguments. For example, TCE 102 may provide code 170 and/or other code in code editor window 104 to an interpreter, which may interpret and/or execute code 170 and may generate an output (e.g., result) based on executing code 170.

In some implementations, TCE 102 may determine that an invalid value has been received, e.g., a user has entered an invalid value. For example, TCE 102 may determine that a user has entered a value including an incorrect spelling, may determine that a user has entered a value associated with an incorrect argument (e.g., an incorrectly sequenced argument), or the like. In some implementations, TCE 102 may provide valid values for display based on determining that the user has entered an invalid value. In this way, TCE 102 may reduce a quantity of errors associated with using functions in program code.

In some implementations, a function may include more or fewer arguments based on particular argument values that are input. For example, a function may require a particular quantity of arguments in order to operate, and the particular quantity may change based on particular values of one or more arguments. In some implementations, TCE 102 may determine that a sufficient quantity (e.g., for the function to operate properly) of arguments has been input. Additionally, TCE 102 may not provide additional arguments and/or valid values for display based on determining that the sufficient quantity of arguments has been input.

In addition to executing code and using a data structure to determine a valid value list for a subsequent argument in a function that immediately follows an argument with a determined valid value, other methods can also be used. In some implementations, TCE 102 may determine one or more valid subsequent argument values of a function based on one or more previously-specified argument values. For example, TCE 102 may determine a valid subsequent argument values based on an input argument (e.g., an input argument name and/or an input argument value).

Additionally, or alternatively, TCE 102 may determine a valid subsequent argument and/or valid value based on a function signature. For example, TCE 102 may determine subsequent valid arguments and/or valid values that follow an argument that has already been input. For example, a function signature may define a quantity of input arguments, an order of input arguments, etc. Additionally, or alternatively, TCE 102 may determine a likely subsequent argument and/or a valid value based on a usage history. For example, TCE 102 may store information identifying subsequent arguments and/or valid values associated with a function that have been selected in the past (e.g., by the user, by another user, etc.). Additionally, TCE 102 may rank the subsequent arguments and/or valid values based on the usage history and/or may provide the subsequent arguments and/or valid values for display (e.g., in an order based on the rank).

Additionally, or alternatively, TCE 102 may determine a valid subsequent argument and/or valid value based on a popularity of the valid subsequent argument and/or valid value. For example, TCE 102 may query an operating system of a device to determine a valid subsequent argument and/or valid value based on a popularity (e.g., a list of devices connected to the device that have been used most frequently, a list of files stored by the device that have been accessed most frequently, a list of most popular search queries, or the like). Additionally, or alternatively, TCE 102 may read values from a file (e.g., a hypertext markup language file (HTML), or the like) to determine a valid subsequent argument and/or a valid value based on a popularity metric.

Additionally, or alternatively, TCE 102 may determine a valid subsequent argument based on a data structure. For example, TCE 102 may use a state machine (e.g., stored in a data structure, stored in memory, etc.) to determine a valid subsequent argument. For example, TCE 102 may create a state machine based on a function signature and may use the state machine to determine a valid subsequent argument based on argument names and/or argument values that have already been input. In some implementations, TCE 102 may store a data structure that represents the state machine.

In some implementations, TCE 102 may create and/or store multiple state machines corresponding to a function. For example, a function may include multiple function signatures and/or may accept different value options for input arguments. The validity of any one signature may be sensitive to the values of previously-supplied arguments. In some implementations, TCE 102 may traverse one or more state machines to determine valid subsequent arguments and/or subsequent valid values. Additionally, or alternatively, TCE 102 may traverse multiple files (e.g., JSON files, or the like) to determine valid subsequent arguments and/or subsequent valid values. For example, TCE 102 may use a collection of state machines to filter valid subsequent arguments and/or valid values.

In this way, implementations described herein may assist a user in using functions in program code by providing a list of valid values corresponding to an input argument. Additionally, implementations described herein may reduce a quantity of errors associated with using functions in program code, thereby conserving computing resources, such as processing power, memory, or the like. For example, if a user uses a function (e.g., by manually inputting argument values), the user may input arguments that do not comply with a function signature of the function (e.g., the user may input an incorrect quantity of input arguments, may input arguments in an incorrect order, etc.). By identifying a function in program code and by providing valid values for input arguments of the function, a device may assist a user in using a function which may generate fewer errors than if the user manually input the arguments.

FIGS. 1A-1L are provided merely as an example. Other examples are possible and may differ from what was described in connection with FIGS. 1A-1L.

Figure 2:
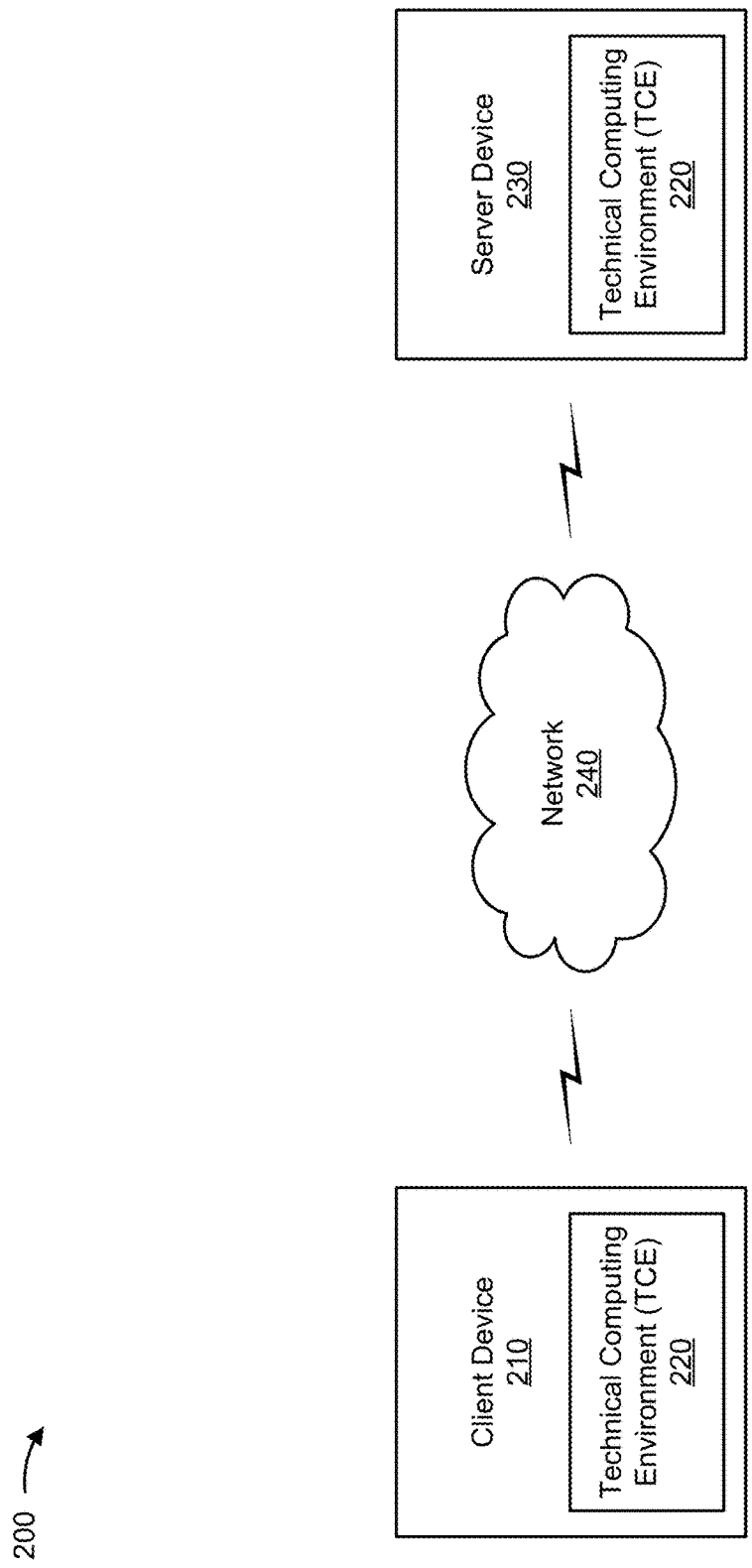
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, which may include a technical computing environment (TCE) 220. Furthermore, environment 200 may include a server device 230, which may include TCE 220, and a network 240. Devices of environment 200 may interconnect via wired connections, wireless connections, or a combination of wired and wireless connections.

Client device 210 may include one or more devices capable of receiving, generating, storing, processing, and/or providing information associated with code. For example, client device 210 may include a computing device, such as a desktop computer, a laptop computer, a tablet computer, a mobile phone (e.g., a smart phone, a radiotelephone, etc.), or a similar device. In some implementations, client device 210 may receive information from and/or transmit information to server device 230.

Client device 210 may host TCE 220. TCE 220 may include any hardware-based component or a combination of hardware and software-based components that provides a computing environment that allows tasks to be performed (e.g., by users) related to disciplines, such as, but not limited to, mathematics, science, engineering, medicine, and business. TCE 220 may include a text-based environment (e.g., MATLAB® software by The MathWorks, Inc.), a graphically-based environment (e.g., Simulink® software, Stateflow® software, SimEvents® software, etc., by The MathWorks, Inc.; VisSim by Visual Solutions; LabView® by National Instruments; Agilent VEE by Agilent Technologies; Advanced Design System (ADS) by Agilent Technologies; Agilent Ptolemy by Agilent Technologies; etc.), or another type of environment, such as a hybrid environment that may include, for example, a text-based environment and a graphically-based environment.

TCE 220 may include, for example, a user interface that permits a user to create and/or modify documents containing code. For example, TCE 220 may provide a code editor that permits a user to create and/or modify a document containing code. In some implementations, TCE 220 may permit the user to create and/or modify code by inputting the code as text. In some implementations, TCE 220 may identify a function in code and may provide valid values for an argument of the function for display, as described in more detail elsewhere herein. For example, TCE 220 may provide an input mechanism that may allow a user to interact with a valid value to select a valid value. In some implementations, TCE 220 may input a selected valid value in code based on a user interaction.

Server device 230 may include one or more devices capable of receiving, generating, storing, processing, and/or providing information associate with code. For example, server device 230 may include a computing device, such as a server, a desktop computer, a laptop computer, a tablet computer, or a similar device. In some implementations, server device 230 may host TCE 220. In some implementations, client device 210 may be used to access one or more TCEs 220 running on one or more server devices 230. For example, multiple server devices 230 may be used to execute program code (e.g., serially or in parallel), and may provide respective results of executing the program code to client device 210.

In some implementations, client device 210 and server device 230 may be owned by different entities. For example, an end user may own client device 210, and a third party may own server device 230. In some implementations, server device 230 may include a device operating in a cloud computing environment. In this way, front-end applications (e.g., a user interface) may be separated from back-end applications (e.g., program code execution). Additionally, or alternatively, server device 230 may perform one, more, or all operations described elsewhere herein as being performed by client device 210.

Network 240 may include one or more wired and/or wireless networks. For example, network 240 may include a cellular network, a public land mobile network (PLMN), a local area network (LAN), a wide area network (WAN), a metropolitan area network (MAN), a telephone network (e.g., the Public Switched Telephone Network (PSTN)), an ad hoc network, an intranet, the Internet, a fiber optic-based network, a private network, a cloud computing network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
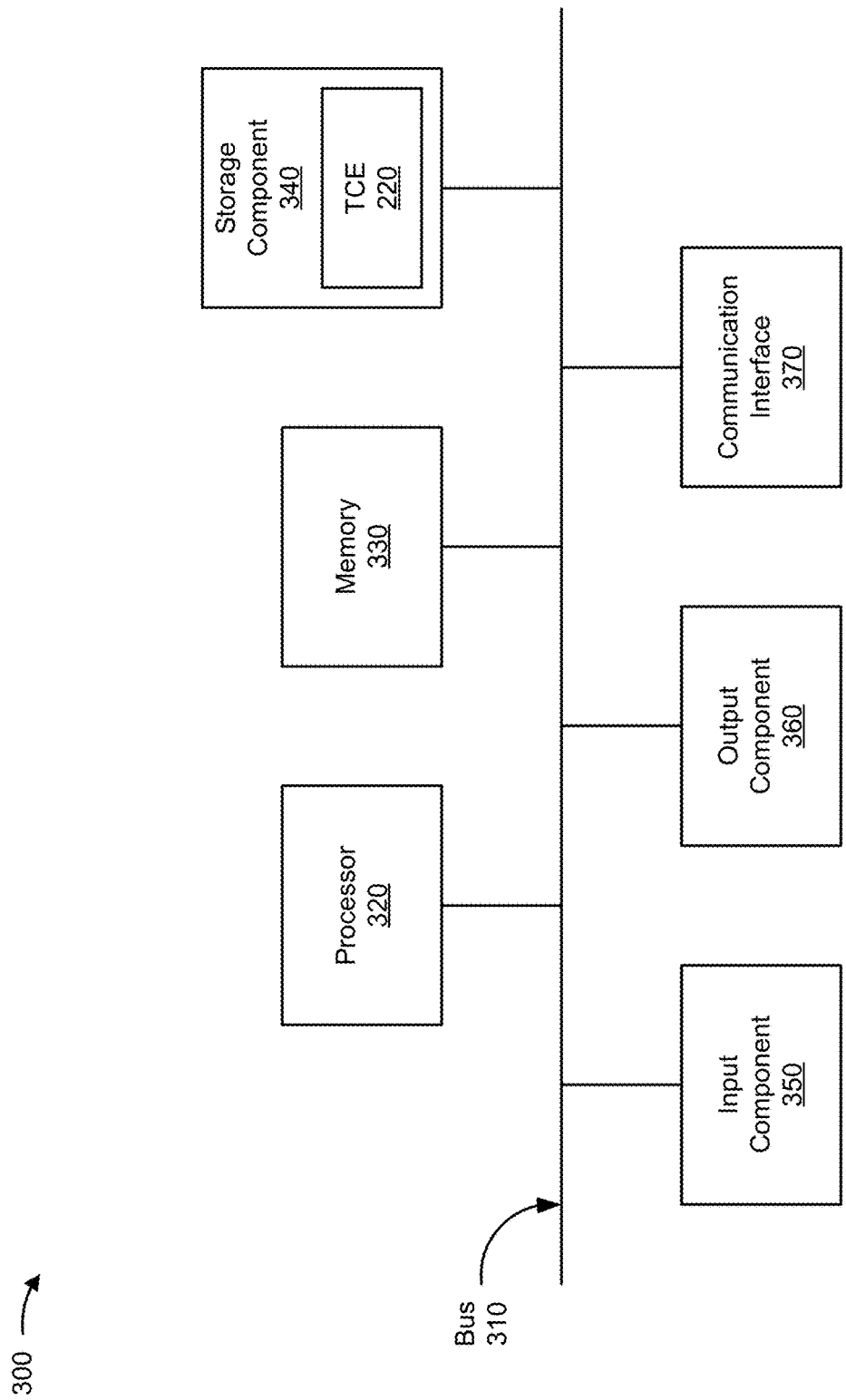
FIG. 3 is a diagram of example components of one or more devices of FIG. 2.

FIG. 3 is a diagram of example components of a device 300. Device 300 may correspond to client device 210 and/or server device 230. In some implementations, client device 210 and/or server device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. In some implementations, processor 320 may include one or more processors that can be programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive. In some implementations, storage component 340 may store TCE 220.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from non-transitory computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for dynamic function argument completion. In some implementations, one or more process blocks of FIG. 4 may be performed by client device 210. In some implementations, one or more process blocks of FIG. 4 may be performed by another device or a group of devices separate from or including client device 210, such as server device 230.

As shown in FIG. 4, process 400 may include receiving first code input by a user (block 410), identifying a function included in the first code (block 420), and executing second code associated with the function (block 430). For example, client device 210 may receive first code associated with a function in a programming environment. Client device 210 may identify a function included in the first code. Client device 210 may execute second code, associated with the function, to determine one or more valid values for an argument of the function. In some implementations, client device 210 may query an operating system associated with client device 210 based on executing the second code. Additionally, or alternatively, client device 210 may query an application associated with client device 210 based on executing the second code. In some implementations, the second code may be provided by a function author. In some implementations, client device 210 may generate a state machine based on executing the second code. Additionally, the state machine may be associated with one or more valid values. Additional details regarding receiving first code, identifying a function included in the first code, and executing second code associated with the function are described above in connection with FIGS. 1A-1L.

As further shown in FIG. 4, process 400 may include determining one or more valid values for an argument of the function based on executing the second code (block 440), and providing the one or more valid values for display (block 450). For example, client device 210 may determine one or more valid values for an argument of the function based on executing the second code. In some implementations, the argument may be a first argument and/or another argument. For example, client device 210 may receive user input that identifies a selected value of a first argument, and may determine one or more valid values for a second argument based on receiving the user input.

In some implementations, client device 210 may determine the one or more valid values based on querying an operating system of client device 210. Additionally, or alternatively, client device 210 may determine the one or more valid values based on querying an application associated with client device 210. In some implementations, client device 210 may determine the one or more valid values based on reading the valid values from a file associated with client device 210. Additionally, or alternatively, the valid values may include values other than filenames. In some implementations, client device 210 may determine the one or more valid values based on a state machine. Client device 210 may provide the one or more valid values for display. Additional details regarding determining and providing valid values for an argument of the function are described above in connection with FIGS. 1A-1L.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flow chart of another example process 500 for dynamic function argument completion. In some implementations, one or more process blocks of FIG. 5 may be performed by client device 210. In some implementations, one or more process blocks of FIG. 5 may be performed by another device or a group of devices separate from or including client device 210, such as server device 230.

As shown in FIG. 5, process 500 may include receiving code input by a user (block 510), identifying a function and one or more argument values, corresponding to one or more input arguments, included in the code (block 520), determining one or more valid subsequent arguments of the function based on the one or more argument values (block 530), determining one or more valid values of the one or more valid subsequent arguments (block 540), and providing the one or more valid values for display (block 550). For example, client device 210 may receive code. In some implementations, client device 210 may receive code based on a user input. For example, client device 210 may receive user input that identifies a function. Client device 210 may identify a function included in the code and a first argument value, corresponding to a first argument of the function, included in the code. In some implementations, client device 210 may identify a function included in the code based on a user input that identifies the function. Client device 210 may determine one or more valid subsequent arguments of the function based on the first argument value.

In some implementations, client device 210 may determine one or more valid values for a subsequent argument associated with the function based on the function and previous argument values. In some implementations, the one or more valid values for the second argument may be automatically chosen from a larger set of valid values based on the first argument value. In some implementations, client device 210 may determine the one or more valid values for the second argument based on determining one or more valid subsequent arguments. In some implementations, client device 210 may determine one or more valid values for the second argument based on a selected value for the previous argument(s). For example, client device 210 may receive user input that identifies a selected value for the first argument, and may determine one or more valid values for the second argument based on the selected value. In some implementations, client device 210 may determine the one or more valid values for the second argument based on querying an operating system associated with client device 210. Additionally, or alternatively, client device 210 may determine the one or more valid values for the second argument based on reading the valid values from a file associated with client device 210. In some implementations, client device 210 may determine the one or more valid values based on generating a state machine. Additionally, or alternatively, client device 210 may eliminate a first state, of one or more states associated with a state machine, based on a first argument value.

Additionally, or alternatively, client device 210 may determine a set of valid values for a third argument of the function based on a selected value for the second argument and/or the first argument value. For example, client device 210 may receive user input that identifies a selected value for the second argument and may determine a set of valid values for the third argument based on receiving the user input. In some implementations, client device 210 may query a data structure using a reference associated with the function or the first argument value to determine the one or more valid values. For example, the data structure may represent a state machine.

In some implementations, client device 210 may provide the one or more valid values for the second argument for display. In some implementations, client device 210 may provide the one or more valid values for the second argument for display based on receiving information identifying a user input of one or more characters. In some implementations, client device 210 may receive information identifying a selected value for the second argument and may provide the code, the first argument value, and the selected value to an execution engine for execution. Additional details regarding process 500 are described in connection with FIGS. 1A-1L.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

In this way, implementations described herein may assist in the creation of program code by providing a list of valid values corresponding to an input argument. Additionally, implementations described herein reduce a quantity of errors associated with using functions in program code, thereby conserving computing resources, such as processing power, memory, or the like. Additionally, implementations described herein may improve productivity and conserve processor and/or memory resources by reducing a user's development time.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Program code (sometimes referred to herein as code) is to be broadly interpreted to include text-based code that may not require further processing to execute (e.g., C++ code, Hardware Description Language (HDL) code, very-high-speed integrated circuits (VHSIC) HDL (VHDL) code, Verilog code, Java code, another type of hardware and/or software based code that may be compiled and/or synthesized, etc.), binary code that may be executed (e.g., executable files that may be directly executed by an operating system, bitstream files that may be used to configure an FPGA, Java byte code, object files combined together with linker directives, source code, makefiles, etc.), text files that may be executed in conjunction with other executables (e.g., Python text files, Octave files, a collection of dynamic-link library (DLL) files with text-based combining, configuration information that connects pre-compiled modules, an XML file describing module linkage, etc.), source code (e.g., readable by a human), machine code (e.g., readable by a machine), or the like. In some implementations, program code may include different combinations of the above-identified classes of code (e.g., text-based code, binary code, text files, source code, machine code, etc.). Additionally, or alternatively, program code may include code generated using a dynamically-typed programming language (e.g., the M language, a MATLAB® language, a MATLAB-compatible language, a MATLAB-like language, etc.) that may be used to express problems and/or solutions using mathematical notations. Additionally, or alternatively, program code may be of any type, such as a function, a script, an object, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving code,
      the receiving the code being performed by one or more devices;
   identifying a function included in the code and a first argument value, corresponding to a first argument of the function, included in the code,
      the identifying being performed by the one or more devices;
   generating a data structure based on the function,
      where generating the data structure includes generating a state machine based on the function, the state machine including one or more states associated with one or more values for a second argument of the function, and
      the generating being performed by the one or more devices;
   eliminating a first state, of the one or more states, based on the first argument value,
      the first state being associated with a value that is invalid when inserted into the code as an input value to the second argument of the function subsequent to the first argument value being included in the code as an input value to the first argument of the function,
      the eliminating being performed by the one or more devices;
   determining one or more valid values, from among the one or more values, for the second argument of the function based on the state machine and eliminating the first state,
      the one or more valid values for the second argument of the function being determined based on the first argument value for the first argument of the function,
      the one or more valid values for the second argument being insertable into the code as an input value to the second argument associated with the function,
         the input value being used during an invocation of the function, and
      the determining being performed by the one or more devices; and
   providing, via a user interface, the one or more valid values for the second argument for selection to be inserted into the code as the input value to the second argument,
      the providing being performed by the one or more devices.

2. The method of claim 1, further comprising:
   receiving user input, via the user interface, that identifies a selected value, for the first argument; and
   where determining the one or more valid values for the second argument comprises:
      determining the one or more valid values for the second argument based on the selected value for the first argument.

3. The method of claim 1, where the one or more valid values for the second argument are chosen from a larger set of valid values based on the first argument value.

4. The method of claim 1, further comprising:
   determining one or more valid subsequent arguments of the function based on the first argument value,
      the one or more valid subsequent arguments including the second argument; and
   where determining one or more valid values for the second argument comprises:
      determining the one or more valid values for the second argument based on determining the one or more valid subsequent arguments.

5. The method of claim 1, where determining the one or more valid values comprises:
   determining the one or more valid values based on reading the one or more valid values from a file.

6. The method of claim 1, where the one or more valid values for the second argument are provided for selection to complete the invocation of the function as the second argument is completed via the user interface.

7. A non-transitory computer-readable medic storing instructions, the instructions comprising:
one or more instructions that, when executed by one or more processors, cause the one or more processors to:
receive code;
identify a function included in the code and a first argument value, corresponding to a first argument of the function, included in the code;
generate a data structure based on the function,
where generating the data structure includes generating a state machine based on the function, the state machine including one or more states associated with one or more values for a second argument of the function;
eliminate a first state, of the one or more states, based on the first argument value,
the first state being associated with a value that is invalid when inserted into the code as an input value to the second argument of the function subsequent to the first argument value being included in the code as an input value to the first argument of the function;
determine one or more valid values, from among the one or more values, for the second argument of the function based on the state machine and eliminating the first state,
the one or more valid values for the second argument of the function being determined based on the first argument value for the first argument of the function,
the one or more valid values for the second argument being insertable into the code as an input value to the second argument associated with the function,
the input value being used during an invocation of the function; and
provide, via a user interface, the one or more valid values for the second argument for selection to be inserted into the code as the input value to the second argument.

8. The non-transitory computer-readable medium of claim 7, where the one or more instructions, that cause the one or more processors to determine the one or more valid values for the second argument, cause the one or more processors to:
query the data structure using a reference associated with the function or the first argument value to determine the one or more valid values.

9. The non-transitory computer-readable medium of claim 7, where the one or more instructions, that cause the one or more processors to determine the one or more valid values for the second argument, cause the one or more processors to:
determine the one or more valid values for the second argument based on querying an operating system.

10. The non-transitory computer-readable medium of claim 7, where the one or more instructions, that cause the one or more processors to determine the one or more valid values for the second argument, cause the one or more processors to:
determine the one or more valid values for the second argument based on reading the one or more valid values from a file.

11. The non-transitory computer-readable medium of claim 7, where the one or more valid values for the second argument are provided for selection to complete the invocation of the function as the second argument is completed via the user interface.

12. The non-transitory computer-readable medium of claim 7, where the one or more valid values for the second argument are chosen from a larger set of valid values based on the first argument value.

13. A device, comprising:
one or more processors to:
receive first code associated with a function in a programming environment;
identify the function included in the first code and a first argument value, corresponding to a first argument of the function, included in the first code;
generate a data structure based on the function,
where generating the data structure includes generating a state machine based on the function, the state machine including one or more states associated with one or more values for a second argument of the function;
eliminate a first state, of the one or more states, based on the first argument value,
the first state being associated with a value that is invalid when inserted into the first code as an input value to the second argument of the function subsequent to the first argument value being included in the first code as an input value to the first argument of the function;
determine one or more valid values, from among the one or more values, for the second argument of the function based on the state machine and eliminating the first state,
the one or more valid values for the second argument of the function being determined based on the first argument value for the first argument of the function,
the one or more valid values for the second argument being insertable into the first code as an input value to the second argument associated with the function,
the input value being used during an invocation of the function; and
provide, via a user interface, the one or more valid values for selection to be inserted into the first code as the input value to the second argument.

14. The device of claim 13, where the one or more processors are further to:
query an operating system associated with the device; and
where the one or more processors, when determining the one or more valid values for the second argument, are to:
determine the one or more valid values based on querying the operating system.

15. The device of claim 13, where the one or more processors are further to:
query an application associated with the device; and
where the one or more processors, when determining the one or more valid values for the second argument, are to:
determine the one or more valid values based on querying the application.

16. The device of claim 13, where the one or more valid values are values other than filenames.

17. The device of claim 13, where the one or more processors, when determining the one or more valid values for the second argument, are to:
determine the one or more valid values based on reading the valid values from a file associated with the device.

18. The device of claim 13, where second code to determine the one or more valid values is provided by a function author.

19. The device of claim 13, where the one or more valid values for the second argument are provided for selection to complete the invocation of the function as the second argument is completed via the user interface.

20. The device of claim 13, where the one or more valid values for the second argument are chosen from a larger set of valid values based on the first argument value.

* * * * *

UNITED STATES PATENT AND TRADEMARK OFFICE
CERTIFICATE OF CORRECTION

PATENT NO. : 10,691,420 B1
APPLICATION NO. : 15/131503
DATED : June 23, 2020
INVENTOR(S) : Jason D. Breslau et al.

It is certified that error appears in the above-identified patent and that said Letters Patent is hereby corrected as shown below:

In the Claims
At Column 17, Claim 7, Line 3, the word "medic" should be corrected to read as the word:
--medium--.

Signed and Sealed this
Eighteenth Day of August, 2020

Andrei Iancu
*Director of the United States Patent and Trademark Office*